(12) United States Patent
Norieda

(10) Patent No.: US 8,976,045 B2
(45) Date of Patent: Mar. 10, 2015

(54) TACTILE FORCE SENSE PRESENTING DEVICE, ELECTRONIC DEVICE TERMINAL APPLIED WITH TACTILE FORCE SENSE PRESENTING DEVICE, AND TACTILE FORCE SENSE PRESENTING METHOD

(75) Inventor: Shin Norieda, Minato-ku (JP)

(73) Assignee: NEC Corporation, Tokyo (JP)

( * ) Notice: Subject to any disclaimer, the term of this patent is extended or adjusted under 35 U.S.C. 154(b) by 684 days.

(21) Appl. No.: 13/148,523

(22) PCT Filed: Jan. 29, 2010

(86) PCT No.: PCT/JP2010/000562
§ 371 (c)(1),
(2), (4) Date: Aug. 9, 2011

(87) PCT Pub. No.: WO2010/095372
PCT Pub. Date: Aug. 26, 2010

(65) Prior Publication Data
US 2011/0316724 A1 Dec. 29, 2011

(30) Foreign Application Priority Data

Feb. 17, 2009 (JP) .................................. 2009-034049

(51) Int. Cl.
*H03K 17/94* (2006.01)
*G06F 3/033* (2013.01)
(Continued)

(52) U.S. Cl.
CPC ............ *G06F 3/03548* (2013.01); *G06F 3/016* (2013.01)
USPC ............... 341/20; 345/161; 345/184; 463/30; 463/38

(58) Field of Classification Search
USPC .......................................................... 341/20
See application file for complete search history.

(56) References Cited

U.S. PATENT DOCUMENTS 4,965,545 A * 10/1990 Johnson ......................... 337/140
5,734,373 A * 3/1998 Rosenberg et al. ........... 345/161
7,038,667 B1 * 5/2006 Vassallo et al. ............... 345/184

FOREIGN PATENT DOCUMENTS

JP 2001117715 A 4/2001
JP 2001-222379 A 8/2001
(Continued)

OTHER PUBLICATIONS

International Search Report of PCT Application No. PCT/JP2010/000562 mailed Mar. 9, 2010.
(Continued)

*Primary Examiner* — Jennifer Mehmood
*Assistant Examiner* — John Mortell
(74) *Attorney, Agent, or Firm* — Sughrue Mion, PLLC

(57) ABSTRACT

A tactile force sense presenting device of the present invention includes: an operation unit which includes an operation lever to be operated by an operator, and a movement guide surface which guides an input of a slide motion of the operation lever in the XY-planar direction and an input of a push-in motion of the operation lever in the Z-axis direction at a specific position on the XY-plane; a detection unit which detects the input of the slide motion of the operation lever in the XY-planar direction and the input of the push-in motion of the operation lever in the Z-axis direction; a calculation control unit which calculates a force corresponding to an operation of the operation lever, based on detection results of the detection unit; and a drive transmission unit which includes a driving unit including at least one actuator, and which causes, based on calculation results of the calculation control unit, the driving unit to generate a resistive force of the operation lever with respect to the input of the slide motion in the XY-planar direction and an adjusting force of the operation lever with respect to the input of the push-in motion in the Z-axis direction.

31 Claims, 14 Drawing Sheets

(51) Int. Cl.
*G06F 17/00* (2006.01)
*G06F 19/00* (2011.01)
*G06F 3/0354* (2013.01)
*G06F 3/01* (2006.01)

(56) References Cited

FOREIGN PATENT DOCUMENTS

| JP | 2001222379 A | 8/2001 |
| JP | 2002259059 A | 9/2002 |
| JP | 2003-57062 A | 2/2003 |
| JP | 2003057062 A | 2/2003 |
| JP | 2004171157 A | 6/2004 |
| JP | 2005-228161 A | 8/2005 |
| JP | 2006-32499 A | 2/2006 |
| JP | 2006228161 A | 8/2006 |
| JP | 2008-503805 A | 2/2008 |

OTHER PUBLICATIONS

Japanese Notice of Allowance for JP Application No. 2011-500484 mailed on Oct. 15, 2013 with Partial English Translation.
International Search Report for PCT/JP2010/000562 mailed Mar. 9, 2010.

* cited by examiner

TACTILE FORCE SENSE PRESENTING DEVICE, ELECTRONIC DEVICE TERMINAL APPLIED WITH TACTILE FORCE SENSE PRESENTING DEVICE, AND TACTILE FORCE SENSE PRESENTING METHOD

TECHNICAL FIELD

The present invention relates to a tactile force sense presenting device and a tactile force sense presenting method which can be applied to an operation unit of an electronic device such as a mobile phone, a PDA, a laptop PC, a game console, and a television remote controller.

BACKGROUND ART

Heretofore, there has been proposed a tactile force sense presenting device which requires a large-scale system and which uses tactile force sense for such as touching a virtual object on a computer (tactile force sense presenting device). This type of tactile force sense presenting device has been applied to electronic devices such as a mobile phone, a PDA, a laptop PC, a remote controller, a mouse, and a game controller, for which portability is highly important.

As this type of tactile force sense presenting device, there have been shown techniques disclosed in Patent Documents 1 through 3. In a tactile force sense presenting device disclosed in Patent Document 1, there is provided a spherical body which includes a moving part thereinside and which is vibratably and rotatably held. This tactile force sense presenting device outputs a tactile force sense signal when a pointer comes in contact with an image displayed on a monitor. In a state where the spherical body is being rotated, the moving part is moved and the spherical body is thereby vibrated according to the tactile force sense signal transmitted from a driving device and an information processing device, thereby presenting a tactile force sense.

In a touch panel of a tactile force sense presenting device disclosed in Patent Document 2, there is provided a transparent and flexible intermediate electrode sheet, and a transparent electrode is formed on both sides thereof. It is configured such that while respectively having a predetermined uniform space between this intermediate electrode sheet and both of the transparent electrodes, an upper side electrode sheet is laminated on an input operation side, and a lower side electrode sheet is laminated on &display device side. The upper side electrode sheet faces the transparent electrode, and it has an upper side transparent electrode. The lower side electrode sheet faces the transparent electrode, and it has a lower side transparent electrode.

A tactile interface device disclosed in Patent Document 3 has a user interface unit having an operation unit to be operated by an operator, a driving unit which drives this user interface unit, and a control unit which controls this driving unit. The driving unit has, in a casing, magnets which are arranged with polarities thereof alternating. The control unit of this tactile interface device causes an electric current to flow through a signal line into a coil within a frame to thereby displace this frame, and it displaces the operation unit attached to this frame, in synchronization with the displacement of this frame. In order to give a reactive force to the operator, the driving unit gives the operation unit a driving force using electromagnetism under the driving control of the control unit.

PRIOR ART DOCUMENTS

Patent Documents

[Patent Document 1] Japanese Unexamined Patent Application, First Publication No. 2001-117715
[Patent Document 2] Japanese Unexamined Patent Application, First Publication No. 2002-259059
[Patent Document 3] Japanese Unexamined Patent Application, First Publication No. 2004-171157

SUMMARY OF THE INVENTION

Problem to be Solved by the Invention

In the techniques disclosed in the above Patent Documents 1 through 3, a resistive force according to an input in the X-axis, Y-axis, and Z-axis direction and the touch sense at the time of this input is generated based on an output from a sensor, the size of which is reduced and the level of freedom of which is made high due to the advancement in technology in recent years. There are required a number of components for detecting an input and for generating a resistive force, in this manner. As for an actuator, it is difficult to miniaturize the size thereof while maintaining an output for sufficiently performing presentation to an operator. For performing a tactile force sense presentation at a higher level of expressiveness, there is a problem in that the overall size of the device becomes large and the weight thereof increases, and further, the price of the device and the level of energy use increase due to the increased number of components.

The present invention has been conceived in view of the above circumstances, and an object thereof is to provide a light-weight and small-size tactile force sense presenting device and a presenting method thereof capable, by simplifying the actuator structure, which could lead to size increase in the device, of performing a tactile force sense presentation at a high level of expressiveness when performing a tactile force sense presentation on a mobile device or a controller associated therewith, for which portability is important.

Means for Solving the Problem

In order to solve the above problem, a tactile force sense presenting device of the present invention includes: an operation unit which includes an operation lever to be operated by an operator, and a movement guide surface which guides an input of a slide motion of the operation lever in the XY-planar direction and an input of a push-in motion of the operation lever in the Z-axis direction at a specific position on the XY-plane; a detection unit which detects the input of the slide motion of the operation lever in the XY-planar direction and the input of the push-in motion of the operation lever in the Z-axis direction; a calculation control unit which calculates a force corresponding to an operation of the operation lever, based on detection results of the detection unit; and a drive transmission unit which includes a driving unit including at least one actuator, and which causes, based on calculation results of the calculation control unit, the driving unit to generate a resistive force of the operation lever with respect to the input of the slide motion in the XY-planar direction and an adjusting force of the operation lever with respect to the input of the push-in motion in the Z-axis direction.

Moreover, a tactile force sense presenting method according to the present invention is for a tactile force sense presenting device including an operation unit which includes an operation lever to be operated by an operator, a movement guide surface which guides an input of a slide motion of the operation lever in the XY-planar direction and an input of a push-in motion of the operation lever in the Z-axis direction at a specific position on the XY-plane, a detection unit which detects the input of the slide motion of the operation lever in the XY-planar direction and the input of the push-in motion of the operation lever in the Z-axis direction, a calculation control unit which calculates a force corresponding to an operation of the operation lever, based on detection results of the detection unit, and a drive transmission unit which includes a driving unit including at least one actuator. The tactile force sense presenting method includes: a simulator calculation step of based on detection data from the detection unit, referencing virtual physical data in a database, simulating a physical phenomenon in a virtual space to thereby update the virtual physical data, and outputting a force to be presented to the operation lever as presenting data; and a tactile force sense presenting actuator control step of outputting control data for controlling the actuator for generating forces based on the presenting data, and causing the operation lever to operate based on the control data.

Effect of the Invention

According to the present invention, after the detection unit has detected an input of a slide motion in the XY-planar direction and an input of a push-in motion in the Z-axis direction of the operation lever, the calculation control unit calculates a force corresponding to the operation of the operation lever, based on the detection results of the detection unit. Then, in the drive transmission unit, based on the calculation results of the calculation control unit, the driving unit, which includes at least one actuator, generates, for the driving unit, a resistive force of the operation lever with respect to the input of the slide motion in the XY-planar direction and an adjusting force with respect to the input of the push-in motion in the Z-axis direction, to transmit them to the operation lever. That is to say, in the present invention, with the driving unit, which includes at least one actuator, a resistive force of the operation lever with respect to an input of a slide motion in the XY-planar direction and an adjusting force of the operation lever with respect to an input of a push-in motion in the Z-axis direction are generated. Accordingly, it is possible to present a tactile force sense associated with an active input motion of the operation lever performed by an operator, and present various types of tactile force sense expressions even with a small number of actuators. As a result, the actuator structure, which could lead to size increase in the device, can be simplified, and it is possible to reduce weight, size and cost while improving the level of energy conservation and operability, and perform a tactile force sense presentation at a high level of expressiveness when performing a tactile force sense presentation on a mobile device or a controller associated therewith, for which portability is important.

EMBODIMENTS FOR CARRYING OUT THE INVENTION

First Exemplary Embodiment

Figure 1:
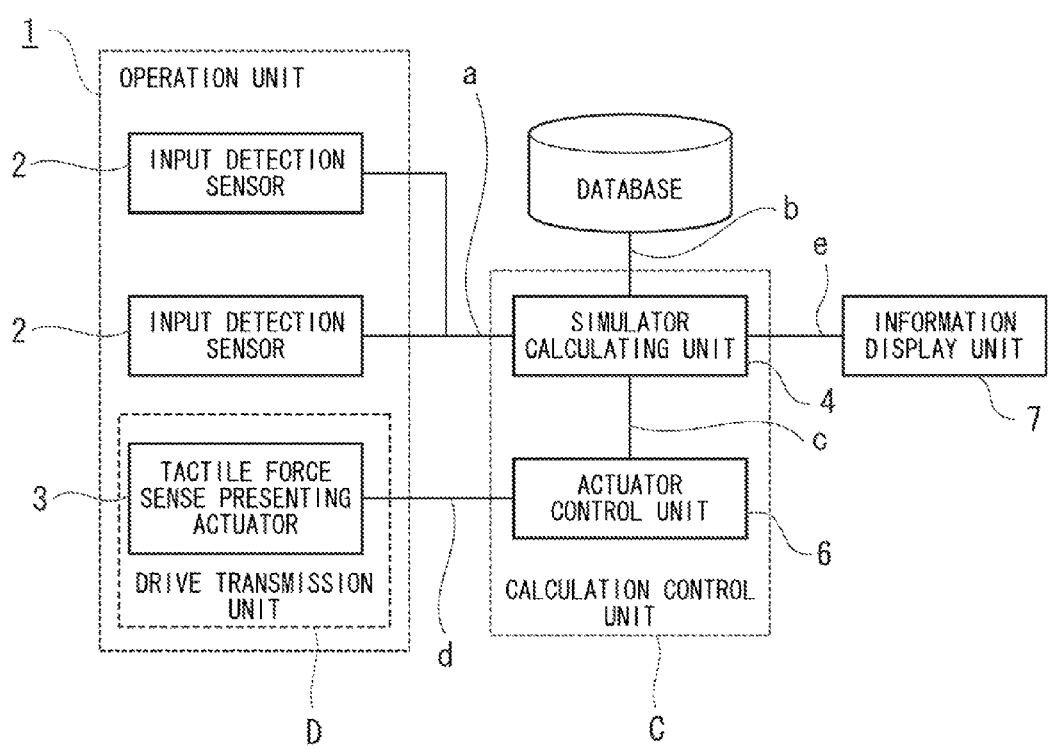
FIG. 1 is a block diagram showing an overall configuration of a tactile force sense presenting device including an operation unit according to a first exemplary embodiment of the present invention.
Figure 2:
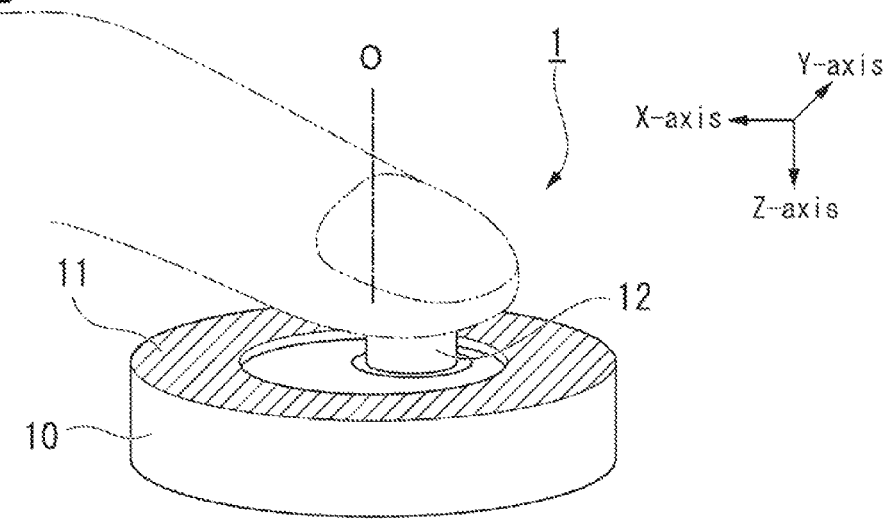
FIG. 2 is a diagram illustrating a state of an input/output operation being performed with an operation unit shown in FIG. 1.

Next, a first exemplary embodiment is described with reference to FIG. 1 through FIG. 10B. FIG. 1 is a block diagram showing a configuration of a tactile force sense presenting device to which the present invention is applied. FIG. 2 is a perspective view showing an operation unit of the tactile force sense presenting device. FIG. 2 is an external view of an operation unit 1 shown in FIG. 1, illustrating an operation being performed with a fingertip of an operator. This operation unit 1 has a protruding-shaped operation lever 12 (to be described later). A region which presents tactile force sense to the operation lever 12 is a contact point of a fingertip. To the operation lever 12, there can be performed inputs of a slide motion on the XY-plane and a push-in motion in the Z-axis direction at a center position O. In the first exemplary embodiment of the present invention, a slide motion on the XY-plane for the operation lever 12 and a push-in motion in the Z-axis direction at the center position O of the operation lever 12 are detected as input data. Based on this input data, there is performed a tactile force sense presentation in which a "resistive force" (presenting force) is generated for the input operation associated with the slide motion on the XY-plane. Moreover, for a push-in motion in the Z-axis of the operation lever 12, based on a target reference virtual surface, there is performed a tactile force sense presentation in which forces such as "antic force", "viscous force", and "inertial force" are returned. In the following description, these "elastic force", "viscous force", and "inertial force" in the Z-axis direction are expressed as "adjusting force (presenting force)" with respect to a push-in force of the operation lever 12.

The tactile force sense presenting device to which the present invention is applied is described with reference to FIG. 1. This tactile force sense presenting device includes an operation unit 1, a simulator calculation unit 4, an actuator control unit 6, and an information presenting unit 7. The operation unit 1 is to be operated by an operator, and it has, inside thereof, input detection sensors 2 and a tactile force presenting actuator 3 (to be described later). The simulator calculation unit 4 makes reference to data in a database 5 and compares detection data output from the input detection sensor 2 of the operation unit 1 therewith. The actuator control unit 6 is driven based on calculation results in the simulator calculation unit 4. The information presenting unit 7 visually displays control information of the actuator control unit 6.

A process in this tactile force sense presenting device is described. The operation unit 1 is operated, and detection data 'a' is output from the input detection sensor 2 of the operation unit 1. The simulator calculation unit 4 makes reference to a virtual physical data 'b', which is virtual object information in the database 5, to compare this detection data 'a' therewith, and then calculates presenting data 'c', which serves as a force for driving the tactile force sense presenting actuator 3. Then, this simulator calculation unit 4, based on the presenting data 'c', outputs display data 'e' for displaying a target reference virtual surface, as visual information to the information presenting unit 7, which is, for example, a display device. Meanwhile, the simulator calculation unit 4, for the database 5, performs a process of updating the virtual physical data 'b', which has been pre-stored based on this presenting data 'c'. In a case where an input of presenting data 'c' is made from the simulator calculation unit 4, the actuator control unit 6 generates, based on the presenting data 'c', control data 'd' for calculating and controlling a force to be presented to the tactile force sense presenting actuator 3, and the tactile force sense presenting actuator 3 is driven based on this control data 'd'.

In the above configuration, the simulator calculation unit 4 and the actuator control unit 6 configure a "calculation control unit C". A "drive transmission unit D (specifically including a guide movement part 30, a compression spring 32, a driving unit 33, a pulley 34, and a wire 35 shown in FIG. 3) (to be described later)" is configured with the tactile force sense presenting actuator 3.

Figure 3:
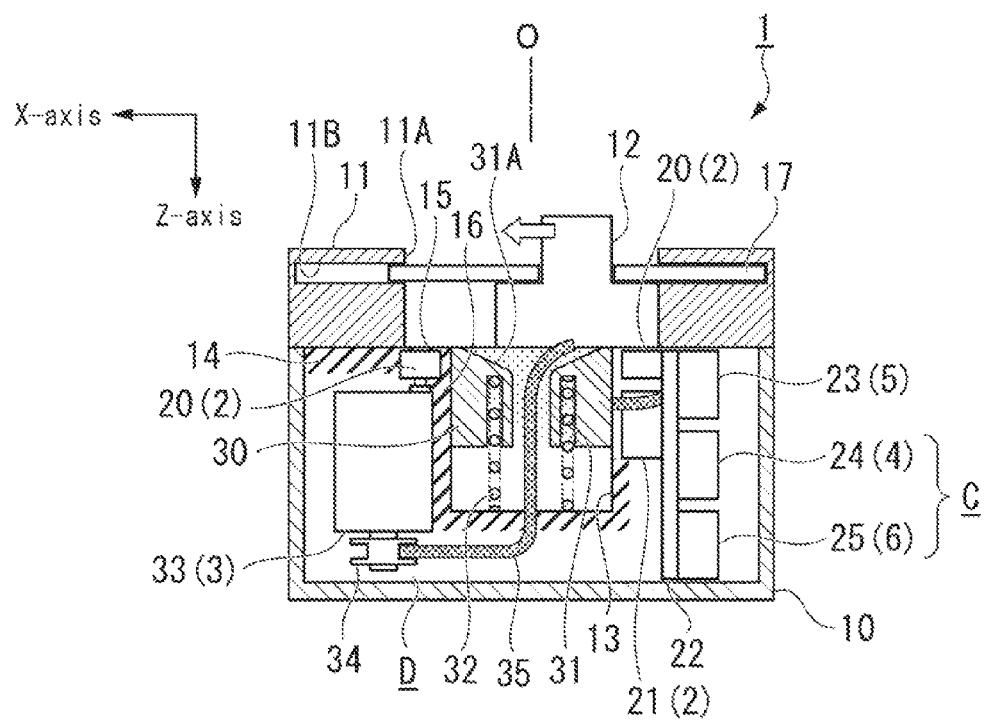
FIG. 3 is a longitudinal-sectional view showing details of the operation unit shown in FIG. 1.

FIG. 3 is a sectional view showing details of the operation unit 1 which is to be directly touched by a finger for performing an input operation and tactile force sense presentation. This operation unit 1 includes a casing 10, a lid member 11, an operation lever 12, and a guide member 14. The casing 10 is entirely formed in a cylindrical shape. The lid member 11 is provided on an upper opening of the casing 10, and it has, in the center section thereof, a circular opening 11A. The operation lever 12 is movably provided within the circular opening 11A of the lid member 11, and it is of a protruding shape in the longitudinal sectional view thereof and is of a circular shape in the plan view thereof. The guide member 14 is provided within the casing 10 and under the lid member 11, and it has a concaved housing part 13 in the center section. On the upper surface of the guide member 14, and between the guide member 14 and the circular opening 11A of the lid member 11, there is formed an XY-axis direction movement guide surface 15 which allows the operation lever 12 to move horizontally.

The wall surface of the concaved housing part 13 within the guide member 14 is formed in a size which allows the operation lever 12 to be housed therein. On the wall surface, there is formed a Z-axis direction movement guide surface 16 which allows the operation lever 12 to move slidably in the Z-axis direction. On the side part of the operation lever 12, there is fixed a cover 17. The cover 17 is housed within a slit 11B which is formed horizontal to the inner wall surface facing the circular opening 11A of the lid member 11. The cover 17 moves together with the horizontal movement of the operation lever 12, and it prevents the housing part 13 from being exposed to the upper part.

In the vicinity of the XY-axis direction movement guide surface 15 of the guide member 14, there is provided a ring-shaped XY-axis movement detection unit 20 for detecting the amount of movement of the operation lever 12 in the XY-axis direction. In the vicinity of the Z-axis direction movement guide surface 16 of the guide member 14, there is provided a Z-axis movement detection unit 21 for detecting the amount of movement of the operation lever 12 in the Z-axis direction. The XY-axis movement detection unit 20 and the Z-axis movement detection unit 21 correspond to the input detection sensor 2 shown in FIG. 1.

The XY-axis movement detection unit 20 and the Z-axis movement detection unit 21 respectively detect the movement amount of the operation lever 12 in the XY-axis direction and in the Z-axis direction, with the basis of a state where the operation lever 12 is present at the center position O (a state shown in FIG. 3 where the operation lever 12 is positioned above the housing part 13 of the guide member 14). The XY-axis movement detection unit 20 and the Z-axis movement detection unit 21 are respectively connected to a wiring substrate 22 provided inside the casing 10. On this wiring substrate 22, there are provided, along with the XY-axis movement detection unit 20 and the Z-axis movement detection unit 21, a memory storage unit 23, an information processing unit 24, and a control unit 25. The memory storage unit 23 stores the amount of a target state (reference virtual surface). The information processing unit 24 calculates the driving amount of the driving unit 33 of the wire 35, based on the detection data obtained by the XY-axis movement detection unit 20 and the Z-axis movement detection unit 21. The control unit 25 controls the adjusting force (presenting force) of the driving unit 33, based on the results of calculations performed by the information processing unit 24. The memory storage unit 23 corresponds to the database 5 in FIG. 1. The information processing unit 24 corresponds to the simulator calculation unit 4 in FIG. 1. The control unit 25 corresponds to the actuator control unit 6 in FIG. 1. The XY-axis detection unit 20 and the Z-axis detection unit 21 which detect the above movement amount are configured with an optical position measurement sensor.

Inside the housing part 13 of the guide member 14, there is provided the guide movement part 30. This guide movement part 30 has, in the center section thereof, a through hole 31, and it is formed in a cylindrical shape. When the operation lever 12 is pushed into the housing part 13 of the guide member 14, the guide movement part 30 is pushed by the operation lever 12 and moves downward together with the operation lever 12. The upper surface of this guide movement part 30, when no force is externally applied thereto, forms part of the XY-axis direction movement guide surface 15, and the operation lever 12 can slide along this upper surface. In the upper part of the through hole 31, there is formed an inclined surface 31A which inclines from the outer side toward the through hole 31 in the center section and which guides the wire 35 (to be described later). Between the lower part of the guide movement part 30 and the bottom surface of the housing part 13 of the guide member 14, there is provided the compression spring 32 for biasing the guide movement 30 upward.

Inside the casing 10 and on the side part of the guide member 14, there is provided the driving unit 33 which is configured, for example, with a stepping motor or the like. This driving unit 33 corresponds to the tactile force sense presenting actuator 3 described above. On an output shaft of the driving unit 33, there is provided the pulley 34. The wire 35 is wound on this pulley 34, and the tip end of this wire 35 is connected to the lower part of the operation lever 12 via the through hole 31 of the guide movement part 30 and the inclined surface 31A of the upper part of the through hole 31.

In a case where the driving unit 33 is driven (for example, the driving shaft is rotated clockwise) and the wire 35 is being wound on the pulley 34, the operation lever 12 enters into the housing part 13 of the guide member 14, and it descends, against the biasing force of the compression spring 32, in the Z-axis direction within the housing part 13 together with the guide movement part 30. In a case where the driving unit 33 is driven (for example, the driving shaft is rotated counterclockwise) and the wire 35 is reeled out from the pulley 34, the operation lever 12 is released or the level of the pulling force applied to the operation lever 12 is lowered, and as a result, in combination with the biasing force of the compression spring 32, there is generated a force which pushes the operation lever 12 upward in the Z-axis direction. With this type of driving performed through the wire 35 by the driving unit 33, which is the tactile force sense presenting actuator 3, a tactile force sense presenting force is given to the operation lever 12 (details of this are described later).

With the type of configuration described above, as shown in FIG. 3, when the operation lever 12 of the operation unit 1 is made to perform a slide motion in the XY-axis direction with a fingertip of the operator, the operation lever 12 moves on the XY-plane along the XY-axis direction movement guide surface 15. At this time, the XY-axis detection unit 20 measures the amount of the displacement movement from the center position O. Moreover, when the operation lever 12 of the operation unit 1 is made to perform a push-in motion in the Z-axis direction at the center position O with the fingertip of the operator, the operation lever 12 moves downward along the cylindrical Z-axis direction movement guide surface 16. At this time, the amount of pushed-in movement of this operation lever 12 is measured by the Z-axis movement detection unit 21.

The driving unit 33 reels in the wire 35 with the pulley 34. Thereby, the pulling force is transmitted to the operation lever 12 of the operation unit 1, and a force serving as a tactile force sense is presented at the operation lever 12. When performing a push-in motion of the operation lever 12, a static force in the Z-axis direction is generated by the guide movement part 30 which moves downward together with the operation lever 12 and the compression spring 32 which supports the guide movement part 30 and biases it upward, and it is further balanced with the pulling force caused by the wire 35, to thereby present a tactile force sense to the operation lever 12.

Figure 4A:
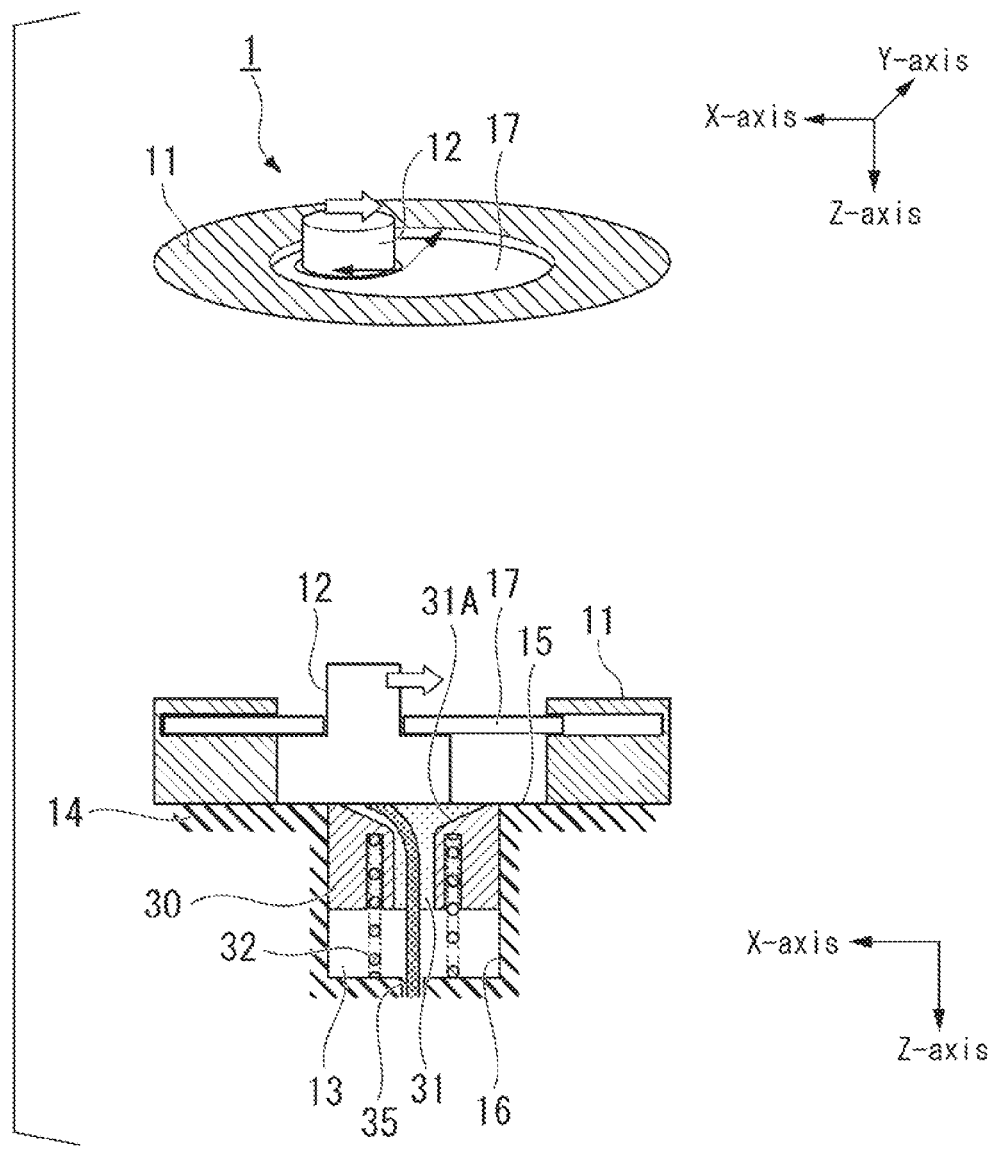
FIG. 4A is an image diagram illustrating a relationship between an input detection state and an output presenting method in the operation unit shown in FIG. 1, showing a motion in the XY-axis direction.
Figure 4B:
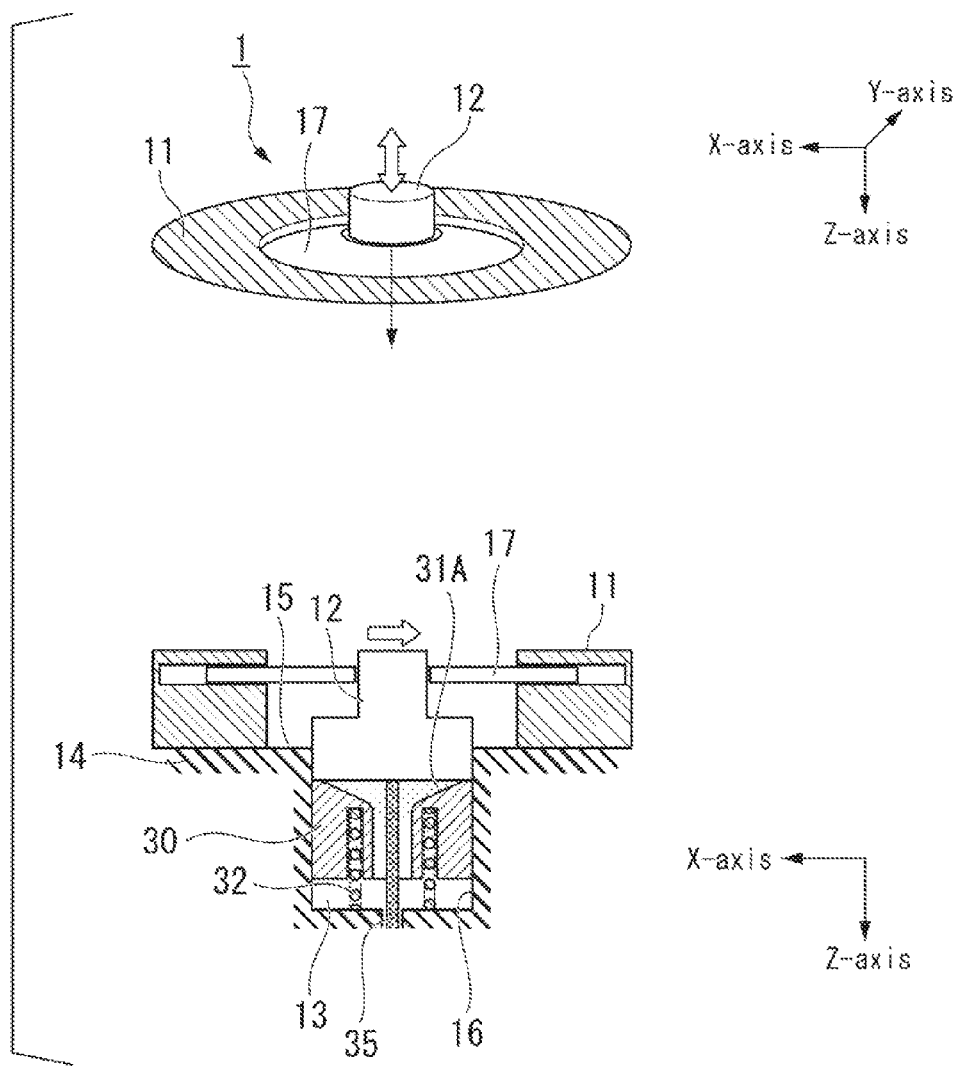
FIG. 4B is an image diagram illustrating a relationship between an input detection state and an output presenting method in the operation unit shown in FIG. 1, showing a motion in the Z-axis direction.

FIG. 4A and FIG. 4B are diagrams for describing a relationship between a state of an input detection performed with the operation lever 12, and a method of output presentation performed with the driving unit 33. FIG. 4A shows a state of each constituent at the time of a slide motion input in the XY-axis direction. The guide movement part 30 is raised, with the force of the compression spring 32, to the bottom surface position of the operation lever 12 of the operation unit 1. The operation lever 12 is allowed to slide only in the XY-axis direction by the XY-axis direction movement guide surface 15 and the guide movement part 30. At this time, the wire 35 is in a free state where it is applying no compressing force to the compression spring 32. Moreover, since the wire 35 is connected to the operation lever 12 of the operation unit 1, the force transmitted through the wire 35 is used only for presenting the force with respect to the input motion for slide to the operation lever 12 in the XY-axis direction. That is to say, with driving of the driving unit 33, there is presented a resistive force which always pulls back to the center direction. By controlling this force, there is presented a tactile force sense which generates a resistive force in association with an active input operation performed by the operator.

FIG. 4B shows a state of each constituent at the time of an input of a push-in motion of the operation lever 12. The operation lever 12 of the operation unit 1 is at the center position O on the XY-plane, and it is allowed to move only in the Z-axis direction by the guide movement part 30 and the Z-axis direction movement guide surface 16. At this time, the operation lever 12 is being pulled by the wire 35, and is compressing the compression spring 32 via the guide movement part 30. The compression spring 32 is compressed by the operation lever 12 and the guide movement part 30, thereby generating a force in the extension direction, and with a resultant force (balance) of this and the force transmitted as a result of the tension or reeling-out of the wire 35, the adjusting force (presenting force) of the operation lever 12 is controlled. As a result, to the operator, there is presented adjusting forces such as "elastic force", "viscous force", and "inertial force" for comprehending the target reference virtual surface.

Figure 5:
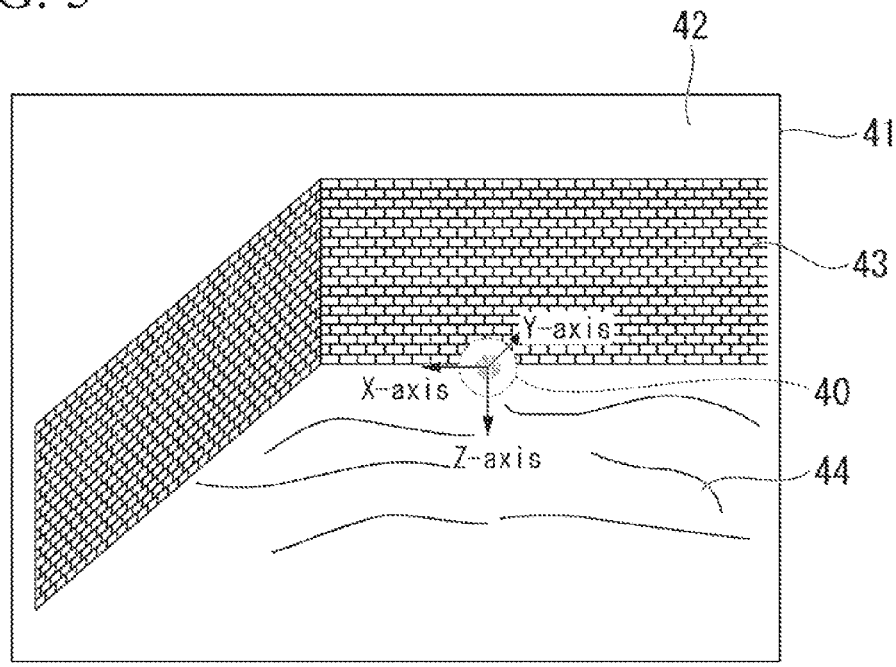
FIG. 5 is a diagram showing an operation pointer in a virtual space, and virtual physical information in the tactile force sense presenting device according to the first exemplary embodiment of the present invention.
Figure 6:
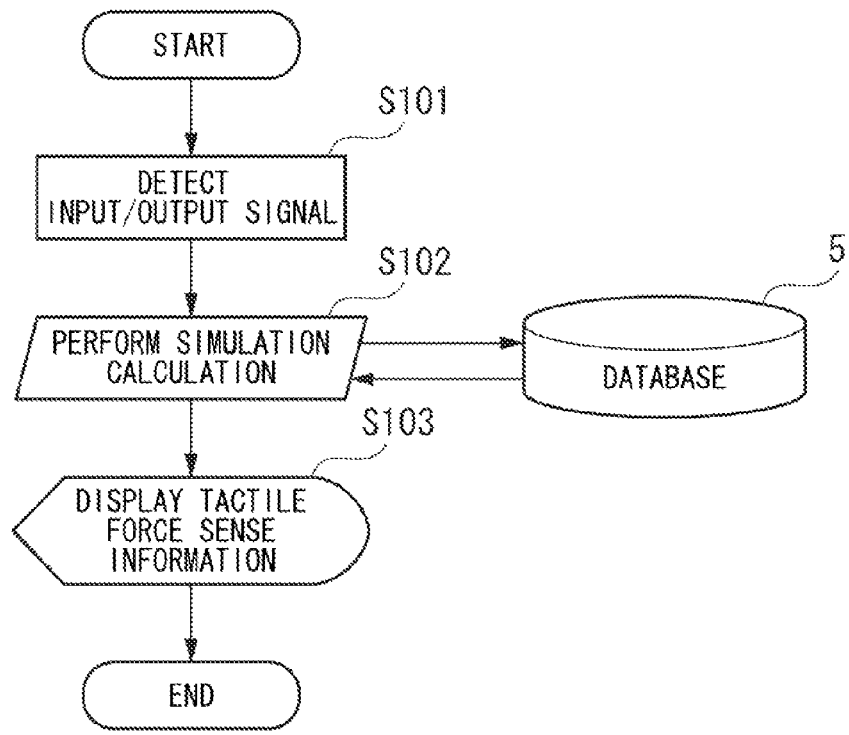
FIG. 6 is a flow chart showing an overall operation of the tactile force sense presenting device according to the first exemplary embodiment of the present invention.

Next, an overall operation of the first exemplary embodiment is described, with reference to FIG. 1 to FIG. 5 and the flow chart of FIG. 6. FIG. 5 is a diagram illustrating an operation pointer in a virtual space and virtual physical information which forms a target reference virtual surface. FIG. 5 shows an operation pointer 40 which moves in synchronization with the operation lever 12 of the operation unit 1. In synchronization with the operation lever 12 of the operation unit 1, this operation pointer 40 moves within the three dimensional virtual space 42 displayed on a display device 41, and it visually displays control results of the actuator control unit 6. This virtual space 42 is a space formed by the X-axis, Y-axis, and Z-axis, and it is configured, for example, with a virtual wall surface 43 and a virtual bottom surface 44. When the operation pointer 40 displayed by an operation of the operation lever 12 comes in contact with the virtual wall surface 43 or the virtual bottom surface 44, which form the target virtual space 42, a position and force, at and with which the operation pointer 40 and the virtual wall surface 43 or virtual bottom surface 44 influence each other, are calculated, and they are presented as a tactile force sense and displayed as visual information to the operator. The display device 41 shown in FIG. 5 corresponds to the information presenting unit 7 shown in FIG. 1.

FIG. 6 is a flow chart showing an overall operation of the tactile force sense presenting device of the first exemplary embodiment. As shown in FIG. 6, in step S101, when the operator operates the operation lever 12 of the operation unit 1, the input detection sensor 2 (corresponding to the XY-axis movement detection unit 20 and the Z-axis movement detection unit 21) detects the position of the operation lever 12 in order to display positional information of the operation lever 12. That is to say, there is detected a position of an input of the operation lever 12 on the XY-plane or in the Z-axis direction, and an electric signal is output as detection data 'a'.

Next, in step S102, the simulator calculation unit 4 (information processing unit 24) makes reference to the virtual physical data 'b' in the database 5 (memory storage unit 23), compares the virtual physical data 'b' with the detection data 'a' from the input detection sensor 2, updates the virtual physical data 'b' according to the relationship of the virtual arrangement and the force balance relationship, outputs display data 'e' which is data for displaying visual information on the information display unit 7 (display device 41), and furthermore, outputs, to the actuator control unit 6 (control unit 25), presenting data 'c' for presenting as a tactile force sense to the operator.

Next, in step S103, the information display unit 7 (display device 41) receives the display data 'e', and displays information on the device such as a display for displaying it as visual information as shown in FIG. 5. Moreover, based on the presenting data 'c' received from the simulator calculation unit 4, the actuator control unit 6 (control unit 25) generates control data 'd' for presenting it as a tactile force sense, and outputs it to the tactile force sense presenting actuator 3 (driving unit 33).

In the flow chart of FIG. 6 described above, the "simulator calculation step" is configured with step 102. Moreover, the "tactile force sense presenting actuator control step" is configured with step S103.

Figure 7A:
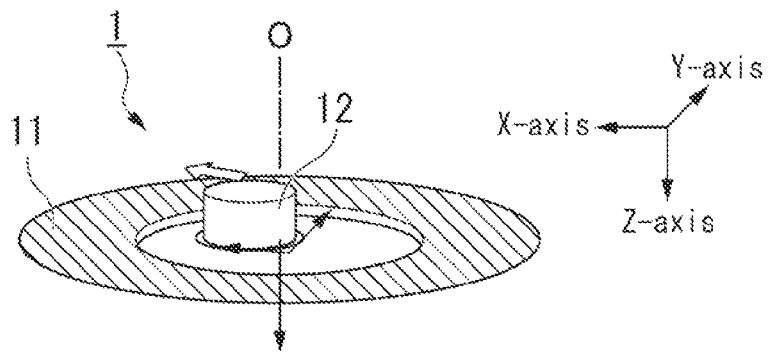
FIG. 7A is an image diagram showing a motion of an operation lever of the operation unit shown in FIG. 1.
Figure 7B:
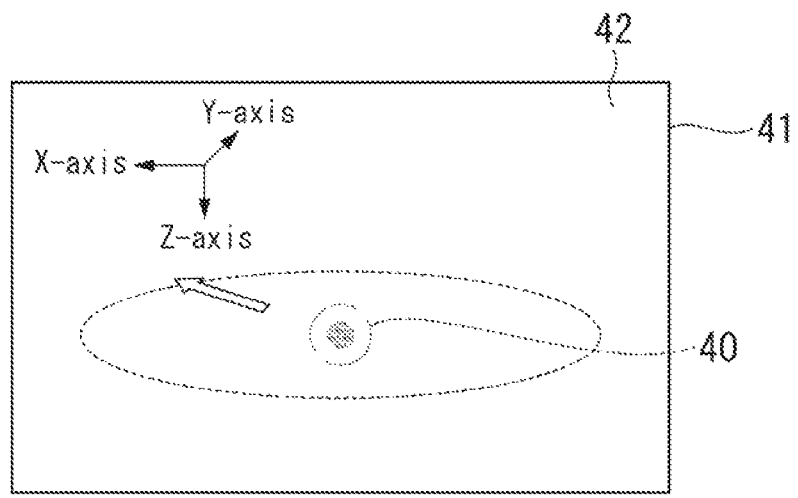
FIG. 7B is a diagram showing details of a motion of the operation pointer in a virtual space in the tactile force sense presenting device according to the first exemplary embodiment of the present invention.
Figure 8:
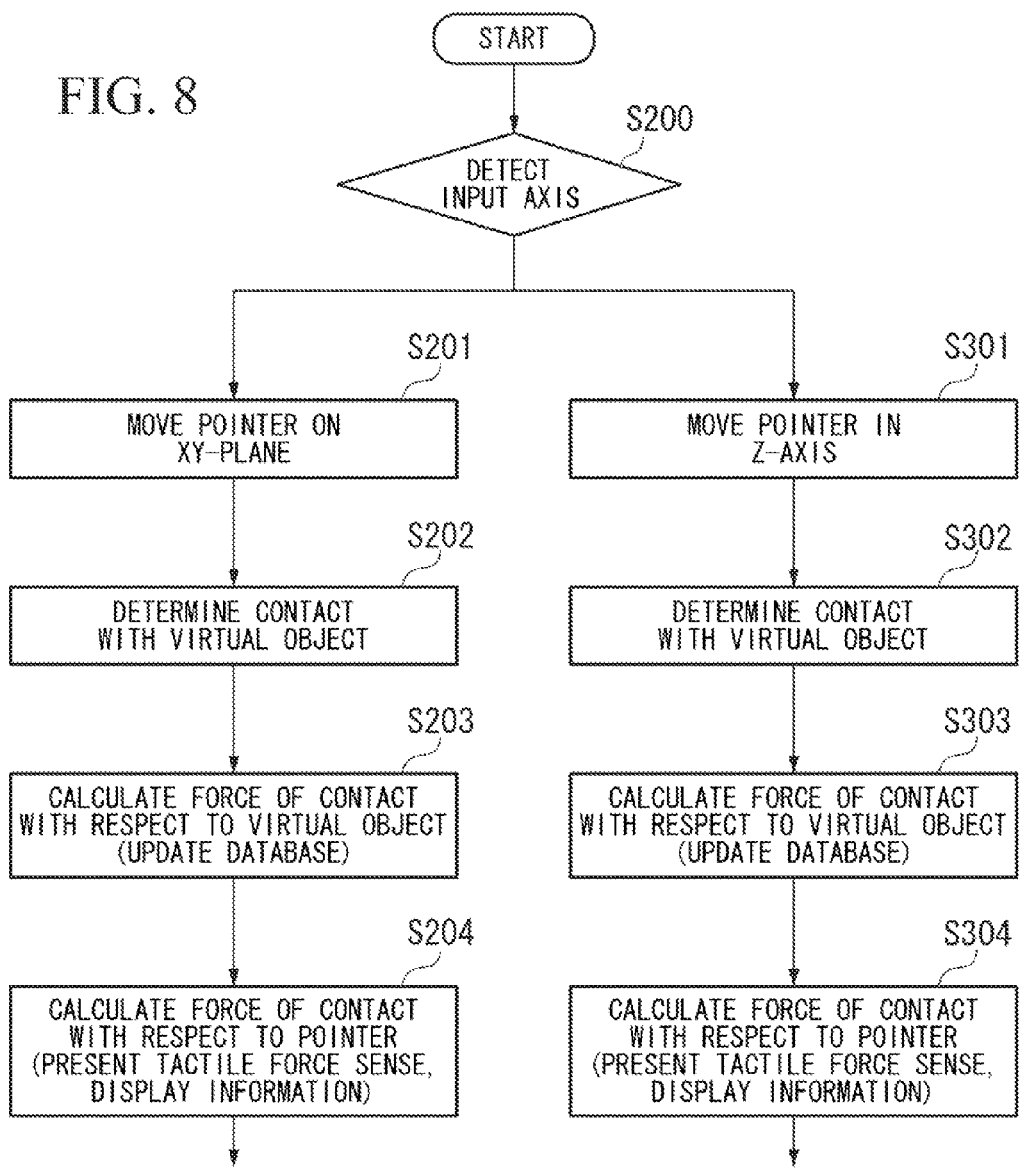
FIG. 8 is a flow chart showing control contents of a calculation control unit which includes a simulator calculation unit and actuator control unit in the tactile force sense presenting device according to the first exemplary embodiment of the present invention.

Next, details of operations of the tactile force sense presenting device of the first exemplary embodiment of the present invention in each step are specifically described, with reference to image diagrams of FIG. 7A and FIG. 7B and the flow chart of FIG. 8. FIG. 7A shows an operation of the operation lever 12 of the operation unit 1, and FIG. 7B shows details of an operation of the operation pointer in the virtual space 42. In step S101, when an input of a movement of the operation lever 12 of the operation unit 1 is detected by the input detection sensor 2, as shown in FIG. 7B, the operation pointer 40 within the virtual space 42 moves according to the movement of the operation lever 12. At this time, if the operation pointer 40 within the virtual space 42 moves according to the amount of the movement of the operation lever 12, the range of movement of the operation pointer 40 within the virtual space 42 is restricted. Therefore, the speed of operation of the operation pointer 40 is changed according to the movement amount of the operation lever 12. When restricting the movement range, the movement amount of the operation lever 12 and the movement amount of the operation pointer 40 within the virtual space 42 may be associated with each other. Moreover, there may be combined and set a region where the movement amount of the operation lever 12 of the operation unit 1 and the movement amount of the operation pointer 40 are associated with each other, and a region where the movement amount of the operation lever 12 and the operation speed of the operation pointer 40 are associated with each other.

FIG. 8 is a flow chart showing control contents of a calculation control unit C which includes the simulator calculation unit 4 and the actuator control unit 6. This flow chart shows control contents for presenting, to the operation lever 12 operated by the operator, a "resistive force (presenting force)" with respect to the XY-axis direction (XY-planar direction), and an "adjusting force" such as "elastic force", "viscous force", and "inertial force" with respect to the Z-axis direction.

When operator operates the operation lever 12 of the operation unit 1, in step S200, based on the detection results from the input detection sensor 2 (corresponding to the XY-axis movement detection unit 20 and the Z-axis movement detection unit 21) detected in the previous step S101, it is determined whether the amount of movement of the operation pointer 40 has been made with respect to the XY-plane or to the Z-axis direction. If the input motion is determined as being an input with respect to the XY-plane, then the process proceeds to step S201. On the other hand, if the input motion is determined as being an input in the Z-axis direction, then the process proceeds to step S301.

In step S201, after the operation pointer 40 is moved on the XY-plane within the virtual space 42, in step S202, the virtual physical data which is physical information of the virtual wall surface 43 in the virtual space 42, is referenced, and a determination of contact between the virtual wall surface 43 and the operation pointer 40 is performed. Here, the operation pointer 40 and the virtual wall surface 43 are formed with mesh such as polygon. After having performed the contact determination between the virtual wall surface 43 and the operation pointer based on the positional relationship between the respective vertexes of the polygon serving as a 3D virtual object, the process proceeds to step S203.

Figure 9A:
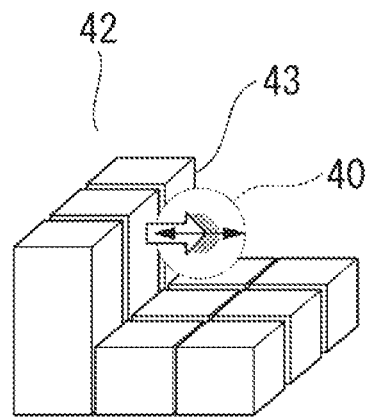
FIG. 9A is an image diagram showing a relationship between the operation pointer and virtual physical data in a virtual space in the tactile force sense presenting device according to the first exemplary embodiment of the present invention, showing a relationship between a virtual wall surface and the operation pointer in the virtual space.

In step S203, there is calculated a position and a force, at and with which the virtual wall surface 43 and the operation pointer 40 influence each other. This is described, with reference to FIG. 9A which shows a relationship between the operation pointer 40 in the virtual space 42 and the virtual physical data. As shown in FIG. 9A, when the operation pointer 40 and the virtual wall surface 43 of the virtual physical data 'b' come in contact with each other as a result of a movement on the XY-plane, there is calculated changes in position and force which occur to both of the virtual objects of the virtual wall surface 43 and the operation pointer 40, through a physical simulation based on the relationship between a virtual spring coefficient, damper coefficient, and mass coefficient of the 3D virtual object of the virtual wall surface 43, and the movement of the operation pointer 40 which moves according to the operation of the operation lever 12 of the operation unit 1. This physical simulation is calculated by means of existing methods such as an analytical method for calculating geometric force correlations and a penalty method for generating forces according to the amount of mutual penetration to virtual objects. While the virtual wall surface 43 is represented as a wall surface, it is a virtual object for presenting a force in the XY-planar direction. If the virtual mass of the virtual wall surface 43 is increased, or if the virtual wall surface 43 is connected to the virtual bottom surface 44, it is possible to represent a wall surface which will not move even when it is pushed with the operation pointer 40. If the virtual wall surface 43 and the virtual bottom surface 44 are separated from each other and an appropriate virtual mass is given thereto, it is possible to represent a virtual wall surface 43 which moves as a virtual object. Having performed this type of calculation, the process proceeds to step S204.

In step S204, the changes in position and force which occur to the virtual wall surface 43 as a result of the contact are updated as the virtual physical data 'b' of the database in step S102 described above. Changes in position and force which occur to the operation pointer 40 as a result of the contact are presented to the operator as a tactile force sense to the operation lever 12 of the operation unit 1. Changes in the position of the virtual wall surface 43 and the operation pointer 40 are displayed as visual information on the display device 41. The input detection state of the operation lever 12 of the operation unit 1 and the output presenting method at this time are in a state shown in FIG. 4A. The compression spring 32 restricts movements of the operation lever 12 of the operation unit 1 to be carried out only within the XY-plane, and it does not exert a force to be directly presented as a tactile force sense to the operator. When the driving unit 33 is driven, the wire 35 is pulled according to the tactile force sense to be generated, and thereby, this pulling force is presented in the operation lever 12 of the operation unit 1 as a tactile force sense to the operator.

Figure 10A:
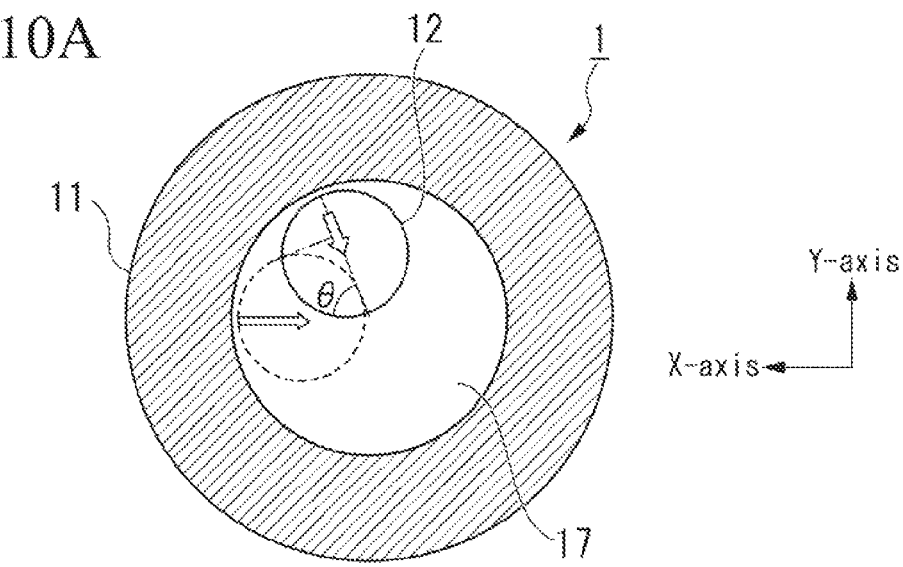
FIG. 10A is an image diagram showing a relationship between the operation pointer and the virtual wall surface in the virtual space and the operation unit of the tactile force sense presenting device according to the first exemplary embodiment of the present invention, being a plan view of the operation unit.
Figure 10B:
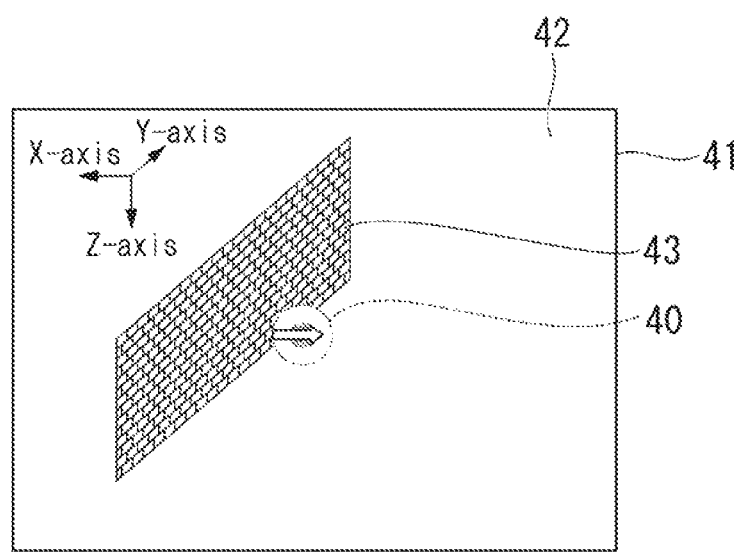
FIG. 10B is an image diagram showing a relationship between the operation pointer and the virtual wall surface in the virtual space and the operation unit of the tactile force sense presenting device according to the first exemplary embodiment of the present invention, being a diagram showing the operation pointer in the virtual space.

FIG. 10A and FIG. 10B are diagrams showing a relationship between the operation lever 12 of the operation unit 1, and the operation pointer and the virtual wall surface in the virtual space 42. As shown in FIG. 10A and FIG. 10B, when an input operation is performed within the XY-plane, it is possible to present a force only in the direction opposite to the direction of the input operation of the operation lever 12 of the operation unit 1. Therefore, if the direction of the input operation of the operation lever 12 is changed at the time of a contact with the virtual wall surface 43 or thereafter, there is presented only a force such that a reactive force from the virtual wall surface 43 calculated in a physical simulation is projected from the operation lever 12 in the direction to the center of the XY-plane. If friction occurs when moving in the direction toward the contact surface in a state of being in contact with the virtual wall surface 43, there is presented only a force such that the resultant force of the reactive force from the virtual wall surface 43 and the frictional force is projected from the operation lever 12 in the direction toward the center of the XY-plane.

Next, there is described the process from S301 through to S304 in a case where the input operation is determined as being an input in the Z-axis direction in step S200 of FIG. 8.

In step S301, the operation pointer 40 is moved in the Z-axis direction in the virtual space 42. Next, the process proceeds to step S302. When the operation pointer 40 is not moving onto the XY-plane, there is no input operation being made on the XY-plane. That is to say, the operation lever 12 of the operation unit 1 is positioned at the center of the XY-plane, and it is restricted to operate only in the Z-axis direction.

In the next step S302, the virtual physical data 'b', which is the physical information of the virtual bottom surface 44 serving as a virtual object within the virtual space 42, is referenced, and it is determined whether the virtual bottom surface 44 and the operation pointer 40 are in contact with each other. Having performed a contact determination similar to that in step S202, the process proceeds to step S303.

Figure 9B:
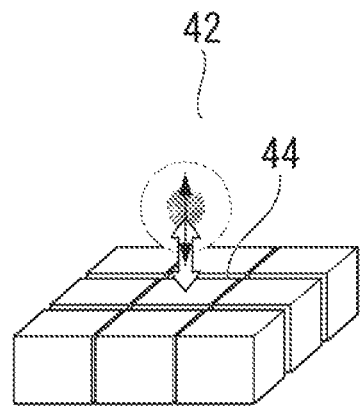
FIG. 9B is an image diagram showing a relationship between the operation pointer and virtual physical data in a virtual space in the tactile force sense presenting device according to the first exemplary embodiment of the present invention, showing a relationship between a virtual bottom surface and the operation pointer in the virtual space.

In step S303, as shown in FIG. 9B, when the operation pointer 40 and the virtual bottom surface 44 of the virtual physical data 'b' come in contact with each other as a result of a movement in the Z-axis at the center position O on the XY-plane, a physical simulation is performed based on the relationship between a virtual spring coefficient, damper coefficient, and mass coefficient of the 3D virtual object of the virtual wall surface 44, and the movement of the operation pointer 40, which moves according to the operation of the operation lever 12 of the operation unit 1, to thereby calculate changes in position and force which occur to both of the virtual objects of the virtual bottom surface 44 and the operation pointer 40. Then, the process proceeds to step S304. The physical simulation in this step S303 is similar to that in step S203. The virtual bottom surface 44 is also treated as a virtual object as with the virtual wall surface 43, and based on the virtual mass of the virtual wall surface 43 and the connective relationship between another virtual bottom surface 44 and the virtual wall surface 43, the virtual wall surface 43 can be represented as a bottom surface which does not move, and as a virtual object in the Z-axis direction which moves as a virtual object.

In step S304, the changes in position and force which occur to the virtual bottom surface 44 as a result of the contact are updated as the virtual physical data 'b' of the database in step S102. Changes in position and force which are applied to the operation pointer 40 as a result of the contact, are presented to the operator as a tactile force sense to the operation lever 12 of the operation unit 1. Changes in the position of the virtual bottom surface 44 and the operation pointer 40 are displayed as visual information on the display device 41.

The input detection state and the output presenting method of the operation lever 12 of the operation unit 1 at this time are in a state shown in FIG. 4B. Movements of the operation lever 12 of the operation unit 1 and the guide movement 30 are restricted to the XY-planar direction, and the operation lever 12 becomes integrated with the guide movement part 30 when pulled by the wire 35, thereby compressing the compression spring 32. The compression spring 32 generates a force in the extension direction by being compressed. The resultant force of the force created by this compression spring 32 and the force transmitted through the wire 35 as a result of the driving unit 33 being driven, is presented to the operator as an adjusting force (presenting force) of the operation lever 12 of the operation unit 1.

In presenting a force in the Z-axis direction, in addition to the resistive force with respect to an input performed by the operator, it is possible to present adjusting forces such as "elastic force", "viscous force", and "inertial force" for comprehending a target reference virtual surface, since the operation lever 12 of the operation unit 1 can be controlled in either the upward direction or downward direction (positive/negative) at an arbitrary timing. As for the "elastic force", a force is generally presented in a direction such that resistance occurs in proportion to changes in the position at which an operation is being committed, however, a force which tends to move away from the direction in which the operation is being committed can also be presented. Similarly, as for the "viscous force" and "inertial force", a force can be presented regardless of the direction of the committed operation. As a result, it is possible to present a tactile force sense representing a sense of being moved when touching a flowing fluid or a sense of being in contact with a moving object.

Next, there are described operations which can be realized with the present invention for presenting a tactile force associated with an active operation performed by an operator.

It may be utilized for warning of a harmful link on a website. There may be provided a warning with use of a tactile force sense presentation by which moving through a link to a homepage which may be harmful to young children can be made impossible, or movement can be made difficult in those cases where a harmful website for other general users is included.

It may be utilized for operation reactions of input operations for a master or slave robot arm or the like. When operating a real object such as a robot arm and radio controlled device, operation reactions in those cases where it comes in contact with an obstacle, or operation reactions at the time of warning before coming in contact with an obstacle can be performed by presenting tactile force sense to the input operation unit on the master side.

It may be utilized for providing reactions in controls of a game such as a driving simulator. In a game which simulates driving operations of an automobile or aircraft, operation reactions at the time of driving on a curved road or the like can be performed by presenting a tactile force sense.

It may be utilized for status comprehension with a tactile map or the like. Status comprehension can be made possible with use of tactile force sense reactions when a person with visual impairment comprehends a map or when a general user comprehends walls and routes in a 3D maze.

It may be utilized for presenting information of stroke orders of Kanji characters in character learning. In order for young children to comprehend the stroke order of characters when they learn Kanji characters, it can be utilized as learning assistance by presenting a resistive force as a tactile force sense for an input made in directions other than the direction along the input such as a character stroke order, a jump stroke, and a flip stroke.

It may be utilized as a means of click-feel feedback when operating a device. Feedback with a tactile force sense is important in key operations for making inputs. For this type of purpose, it is possible to freely change input feedback for the user to notice changes in inputs, by returning force feedback which can be easily understood or returning a type of force feedback which differs from the conventional click feel.

It may be utilized as a means of providing feedback for operating a musical instrument such as a piano, a surgical simulation, or shape formation with clay. As a type of pre-learning for device use or a type of entertainment, a tactile force sense can be presented as device feedback for an input.

It may be utilized for status recognition for tactile force sense product information. Unlike purchasing a product at an actual retail store, a problem with product purchase on a website or television program is actual feeling of products. By presenting information of a tactile sense perceived when touching a product, there can be made a product purchase with better understanding of the product.

It may be utilized as an entertainment such as comprehending an illusory image. A sense of strangeness may be presented to a user by providing information in which visual information and tactile force sense presentation information do not match with each other. For example, an illusory image of continuous stairs produced by Maurits Cornelis Escher cannot be touched as a real object. However, an illusory image may be touched with use of a tactile force sense input/output presenting device of the present invention which uses only virtual physical information.

In the present exemplary embodiment, the driving unit 33 and the wire 35 are separate bodies. However, it is not limited to this, and a BioMetal (registered mark), which is a wire-shaped actuator and extension and contraction of which can be electrically controlled, may be used as the driving unit 33. In the present exemplary embodiment, the XY-axis movement detection unit 20 and the Z-axis movement detection unit 21 are configured with a sensor which optically measures a position. It is sufficient as long as the XY-axis movement detection unit 20 and the Z-axis movement detection unit 21 are capable of measuring positions, and for example, a magnetic sensor may be used therefor. In the present exemplary embodiment, the compression spring 32 is configured with a coil-shaped spring. It is sufficient as long as the compression spring 32 is of the mechanism for providing restoring force, and for example, a plate spring may be used therefor. In the present exemplary embodiment, the Z-axis direction movement guide surface 16 is in a cylindrical shape, and it guides the Z-axis direction movement of the operation lever 12 of the operation unit 1. However, it is sufficient as long as it is capable of restricting movements, and for example, a hole may be provided in the center of the operation lever 12 of the operation unit 1, and the Z-axis direction movement of the operation lever 12 may be guided with a rod-shaped Z-axis direction movement guide surface 16. In the present exemplary embodiment, the Z-axis direction movement guide surface 16, which guides the push-in of the operation lever 12 in the Z-axis direction, is arranged at the center position O on the XY-plane. However, as long as the push-in of the operation lever 12 in the Z-axis direction can be guided, it may be arranged at a position other than the center position O where the ratio of arrangement on the XY-plane is different.

In the first exemplary embodiment, the housing part 13 of the guide member 14 is positioned at the center of the casing 10. However, it is not limited to this, and the housing part 13 of the guide member 14 may be positioned at a position decentered from the center of the casing 10. In the first exemplary embodiment, the driving unit 33, which configures the tactile force sense presenting actuator 3, is configured with a single actuator, however, there is no particular limitation on the number of these actuators.

As described in detail above, in the tactile force sense presenting device shown in the first exemplary embodiment of the present invention, the XY-axis movement detection unit 20 and the Z-axis movement detection unit 21 detect a XY-planar slide motion and a Z-axis direction push-in motion of the operation lever 12, and then the calculation control unit C including the simulator calculation unit 4 and the actuator control unit 6 calculates a force with respect to the operation of the operation lever 12, based on the detection results of the detection units. Then, in the drive transmission unit D, based on the calculation results from the calculation control unit C, the driving unit 33, which includes at least one actuator, generates, for the driving unit 33, a resistive force (presenting force) of the operation lever 12 with respect to the slide motion on the XY-plane and an adjusting force with respect to the input of the push-in motion in the Z-axis direction, to transmit the forces to the operation lever 12. That is to say, in the tactile force sense presenting device shown in the first exemplary embodiment, the driving unit 33, which includes at least one actuator, generates a resistive force (presenting force) of the operation lever 12 with respect to a slide motion on the XY-plane, and an adjusting force (presenting force) of the operation lever 12 with respect to a push-in motion in the Z-axis direction. Accordingly, it is possible to present a tactile force sense associated with an active operation of the operation lever 12 performed by an operator, and present various types of tactile force sense expressions even with a small number of actuators. As a result, the actuator structure, which could lead to size increase in the device, can be simplified, and it is possible to reduce weight, size and cost while improving the level of energy conservation and operability, and perform a tactile force sense presentation at a high level of expressiveness when performing a tactile force sense presentation on a mobile device or a controller associated therewith, for which portability is important.

Second Exemplary Embodiment

Figure 11:
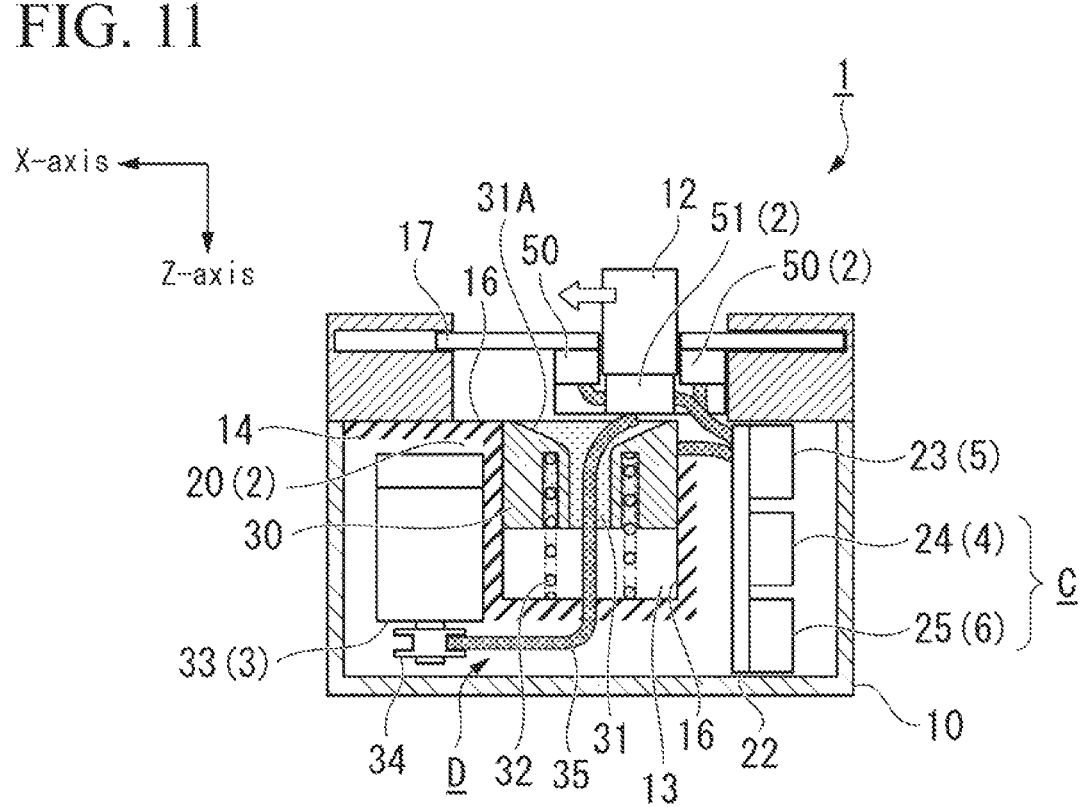
FIG. 11 is a longitudinal-sectional view showing details of an operation unit according to a second exemplary embodiment of the present invention.

Next, a second exemplary embodiment of the present invention is described, with reference to FIG. 11. In the following description, the same reference symbols are given to the same constituents as those in the first exemplary embodiment, and overlapping descriptions thereof are omitted.

A tactile force sense presenting device according to the second exemplary embodiment differs from the first exemplary embodiment in that a XY-axis movement detection unit and a Z-axis movement detection unit provided as an input detection sensor 2 are configured with a piezoelectric element. That is to say, on the side part of the operation lever 12, there is provided a XY-axis movement detection unit 50 which includes a piezoelectric element. Moreover, on the under part of the operation lever 12, there is provided a Z-axis movement detection unit 51 which similarly includes a piezoelectric element.

These XY-axis movement detection unit 50 and Z-axis movement detection unit 51 detect a force applied to the operation lever 12 of the operation unit 1. An information processing unit 24 (simulator calculation unit 4) calculates the direction and amount of movement of the operation lever 12 based on the output from the XY-axis movement detection unit 50 and the Z-axis movement detection unit 51.

In those cases where these types of XY-axis movement detection unit 50 and Z-axis movement detection unit 51 including a piezoelectric element are used, as for the amount of movement of the operation pointer 40 in step S201 and step S301 shown in FIG. 8, the operation speed of the operation pointer 40 is changed according to the magnitude of force detected by the XY-axis movement detection unit 50 and the Z-axis movement detection unit 51. When this type of piezoelectric element is used, limitation on the movement direction in operation of the operation lever 12 is eliminated. Therefore, the operation pointer 40 is moved in an arbitrary direction in the XYZ-space so as to correspond to an input operation performed on the operation lever 12, and in step S200, the amount of movement on the XY-plane and the amount of movement in the Z-axis direction are component-categorized. Thereby, the process in steps S201, S301, and thereafter may be performed. As a result, at least as for the input operation performed with the operation lever 12, there is no restriction on the operation direction of the operation pointer 40 in the virtual three-dimensional space.

Third Exemplary Embodiment

Figure 12A:
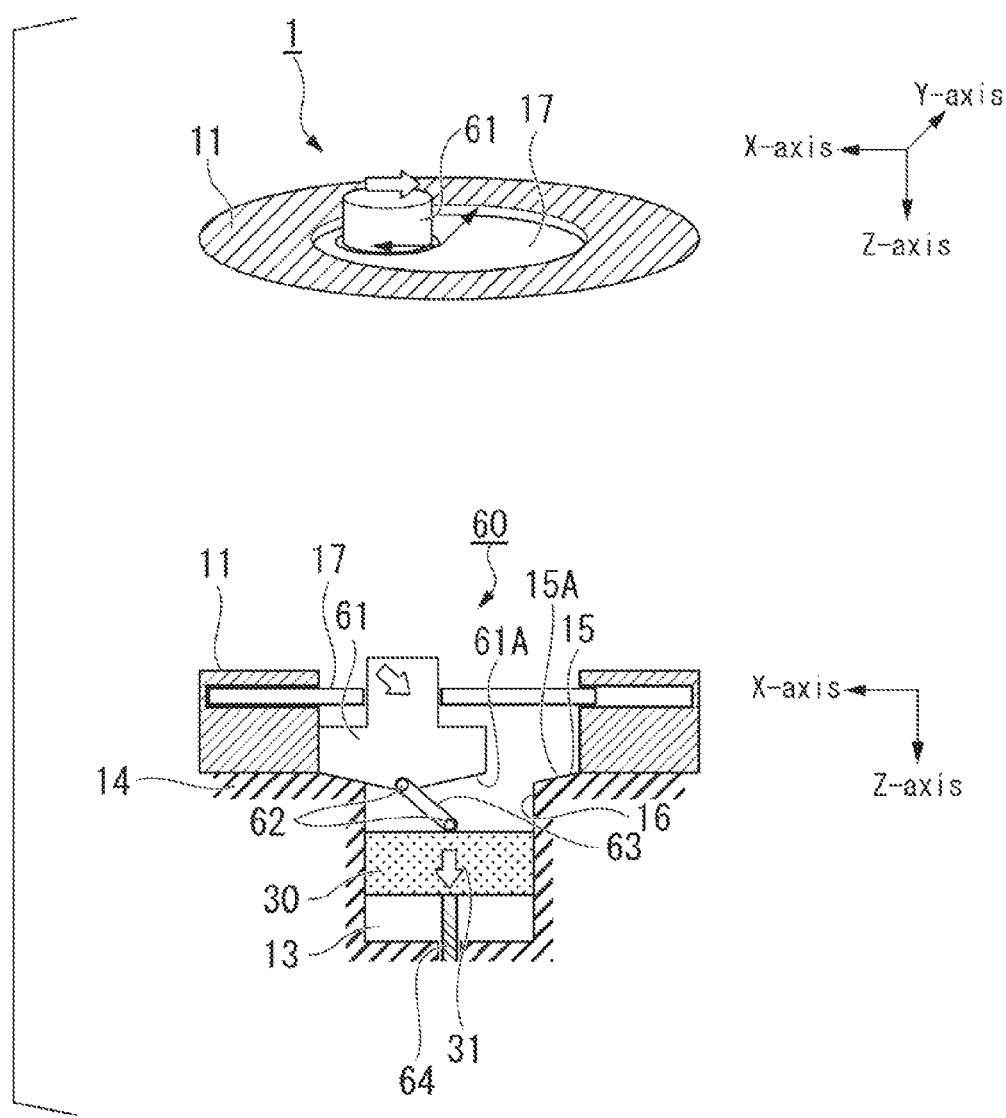
FIG. 12A is a diagram showing a relationship between an input detection state and an output presenting method according to a third exemplary embodiment of the present invention, showing a motion in the XY-axis direction.
Figure 12B:
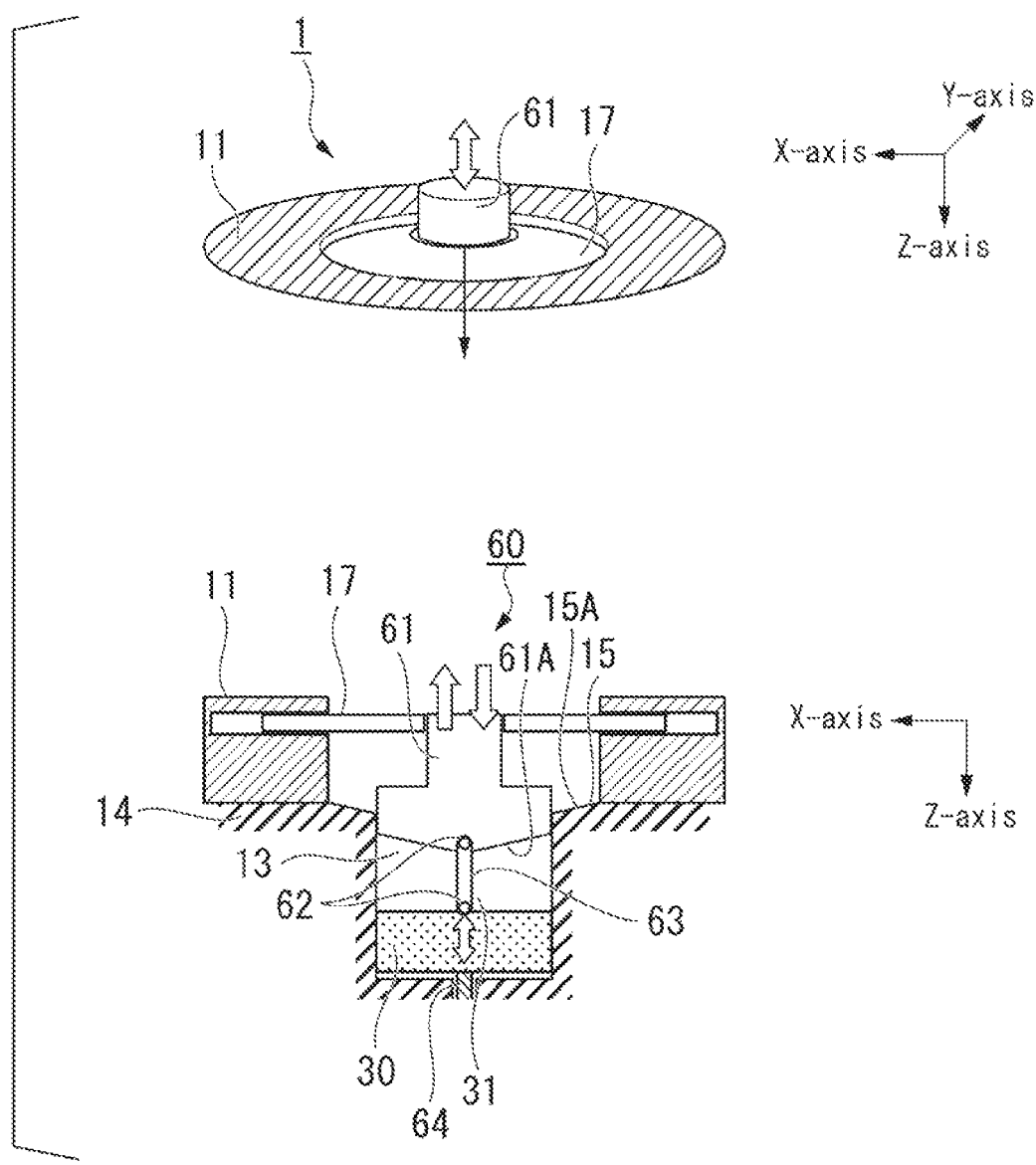
FIG. 12B is a diagram showing a relationship between an input detection state and an output presenting method according to the third exemplary embodiment of the present invention, showing a motion in the Z-axis direction.

Next, a third exemplary embodiment of the present invention is described, with reference to FIG. 12A and FIG. 12B. The third exemplary embodiment differs from the first exemplary embodiment in that the configuration of the mechanism for converting transmission and direction of a force is changed. In the following description, the same reference symbols are given to the same constituents as those in the above exemplary embodiments, and overlapping descriptions thereof are omitted.

FIG. 12A and FIG. 12B are diagrams showing a relationship between an input detection state and an output presenting method according to the second exemplary embodiment of the present invention. In the first exemplary embodiment, as shown in FIG. 4A and FIG. 4B, a force is presented by transmitting a force by pulling the wire 35, and with the resultant force of the pulling force of the wire 35 and the extension force with respect to the compression of the compression spring 32. On the other hand, in the present exemplary embodiment, for transmitting forces, there is used a direction conversion unit 60 which has a link mechanism. An operation lever 61 of the operation unit 1 and a direction conversion link member 63 are connected by means of a ball joint 62 of the direction conversion link member 63, and thereby, the directions of presenting forces in the XY-planar direction and Z-axis direction are converted. Moreover, with use of a screw 64, rotation is converted to parallel movement of the guide movement part 30 to transmit the force.

Specifically, the operation lever 61 shown in the third exemplary embodiment has an inclined surface 61A the lower surface of which inclines upward to the periphery section. That is to say, the operation lever 61 is formed in a shape such that the center thereof protrudes downward. In conformity to the inclined surface 61A, the inner periphery section of the XY-axis direction movement guide surface 15 of the guide member 14 is also formed with an inclined surface 15A which inclines downward to the Z-axis direction movement guide surface 16. The inclined surface 61A of this type of operation lever 61 is guided by the inclined surface 15A of the XY-axis direction movement guide surface 15, and thereby, the operation lever 61 can enter into and exit from the housing part 13 of the guide member 14.

Between the lower center of the operation lever 61 and the guide movement part 30, there is provided the direction conversion link member 63 having the rotatable ball joint 62 on both end sections thereof. The direction conversion link member 63 is connected, by the ball joint 62, to the lower center of the operation lever 61 and the guide movement part 30 respectively. To the lower section of the guide movement part 30 there is connected the screw 64. This screw 64 is rotation-driven by the driving unit that is an actuator not shown in the figure. The screw 64 is capable, with this rotation driving, of moving the guide movement part 30 along the Z-axis.

The operation at the time of presenting a force is described with reference to FIG. 12A. When the operator performs a movement on the XY-plane with the operation lever 61 of the operation unit 1, the driving unit is driven to rotate the screw 64 based on a command from the control unit 25, and thereby, the guide movement part 30 makes a parallel movement in the Z-axis direction to generate a force. The direction conversion link member 63 converts the direction of the force of the guide movement part 30 being lowered in the Z-axis direction into a direction of a force of the operation lever 61 of the operation unit 1 moving toward the center within the XY-plane. As a result, it is possible to generate a resistive force (presenting force) with respect to the input operation of the operation lever 61.

At this time, the bottom surface of the operation lever 61 and the inclination of the inclined surfaces 15A and 61A for restricting the movement to the XY-axis direction are appropriately adjusted, and thereby, the configuration may be made such that the Z-axis direction force of the guide movement part 30 provided by the direction conversion link member 63 can be easily converted to a XY-axis direction force of the operation lever 61 of the operation unit 1.

Next, the operation at the time of presenting a force is described with reference to FIG. 12B. When the operator performs a Z-axis direction movement with the operation lever 61 of the operation unit 1, the screw 64 is rotated and there is generated a force which further lowers the guide movement part 30 in the Z-axis direction. Since a Z-axis direction force is presented in a state where the guide movement part 30 and the operation lever 61 of the operation unit 1 are integrated by the direction conversion link member 63, it is possible to perform control so that a resistive force (presenting force) can be presented with respect to an input operation of the operation lever 61 of the operation unit 1, and in addition, it is possible to perform control so that a tactile force can be presented in either the upward direction or downward direction (positive/negative) at an arbitrary timing.

In the first exemplary embodiment, when presenting a force in the Z-axis direction, the pulling force of the wire 35 and the extending force of the compression spring 32 are used in order to generate positive and negative forces. On the other hand, in the third exemplary embodiment, positive and negative forces can be controlled by rotating the screw 64 with the driving unit, and therefore, it is possible to generate forces more efficiently. Moreover, with respect to the input operation on the XY-axis direction movement guide surface 15, the operation lever 61 of the operation unit 1 can present a resistive force (presenting force) in a direction toward the center within the XY-plane, and the operation lever 61 of the operation unit 1 can also present a resistive force (presenting force) in an outward direction from the center.

Fourth Exemplary Embodiment

Figure 13A:
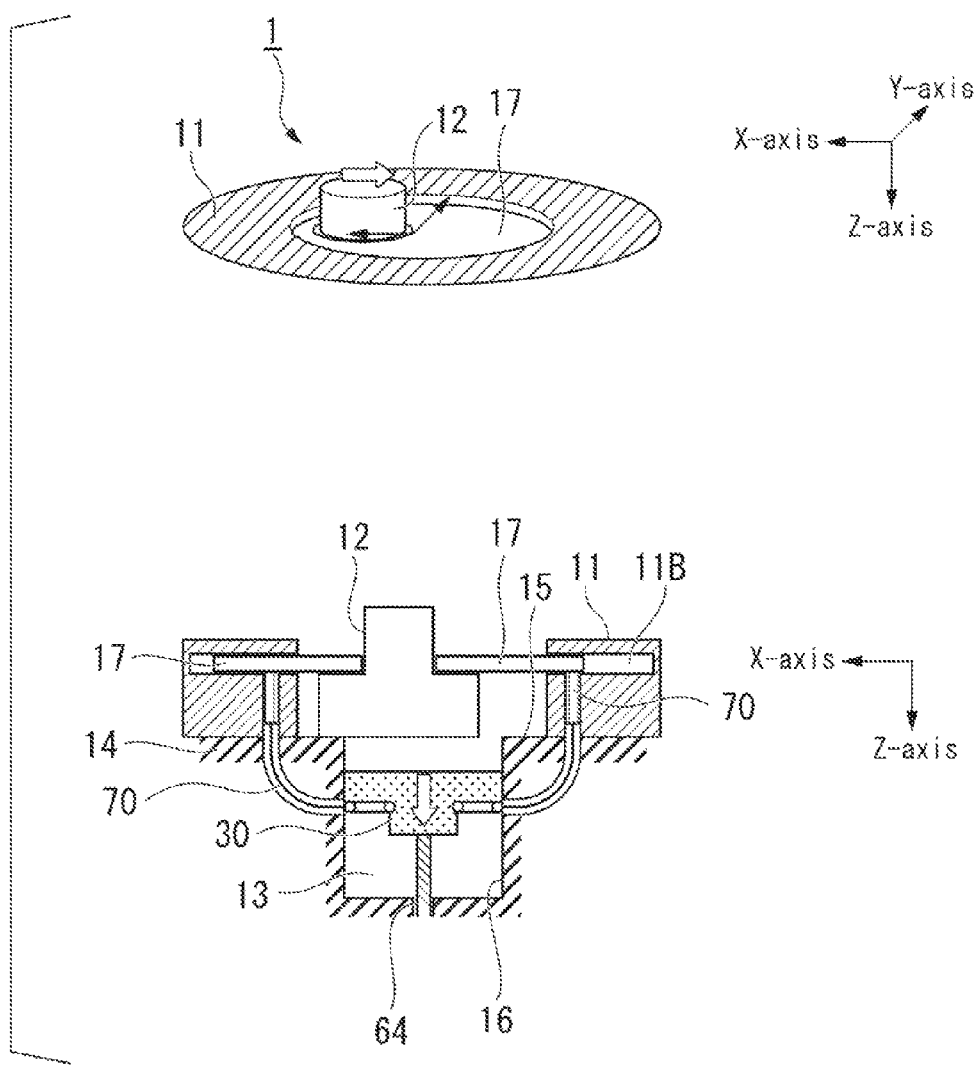
FIG. 13A is a diagram showing a relationship between an input detection state and an output presenting method according to a fourth exemplary embodiment of the present invention, showing a motion in the XY-axis direction.
Figure 13B:
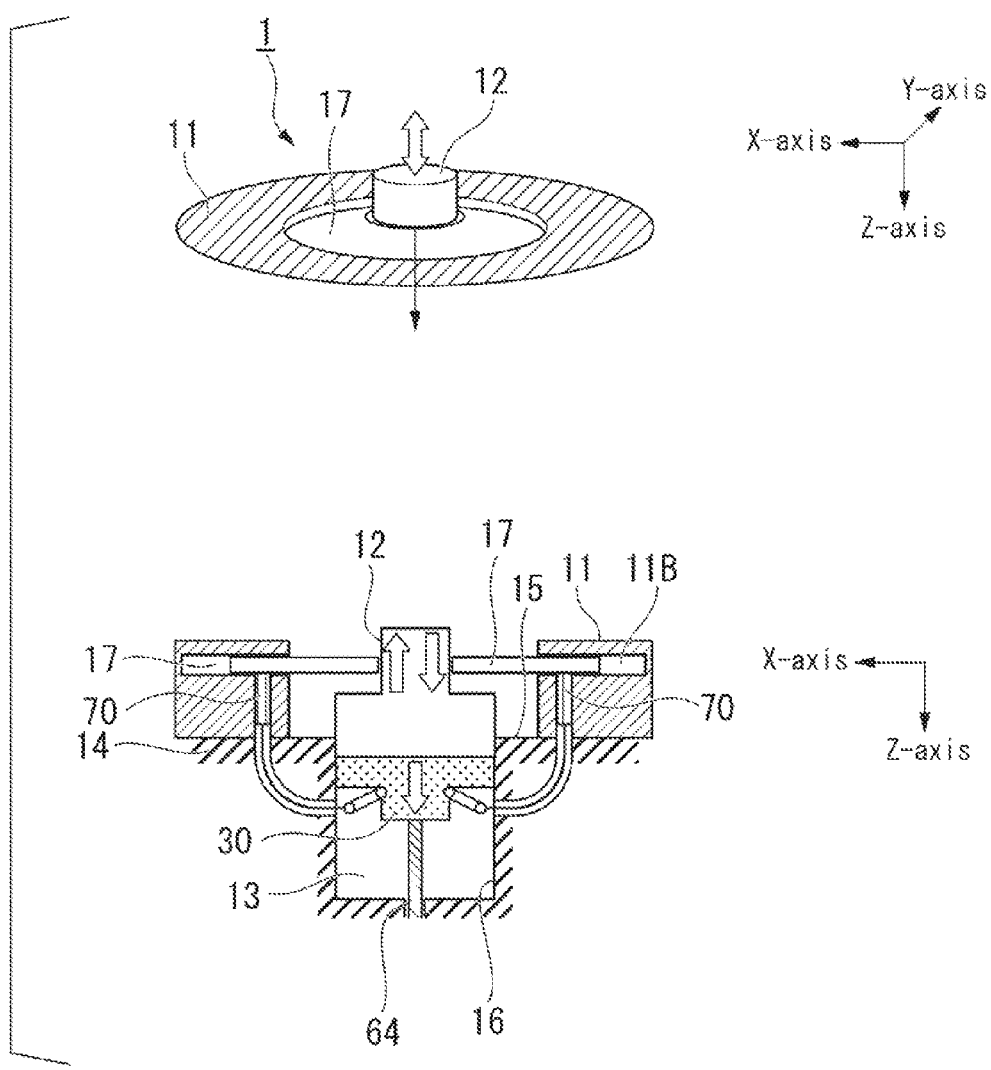
FIG. 13B is a diagram showing a relationship between an input detection state and an output presenting method according to the fourth exemplary embodiment of the present invention, showing a motion in the Z-axis direction.

Next, a fourth exemplary embodiment of the present invention is described, with reference to FIG. 13A and FIG. 13B. The fourth exemplary embodiment differs from the first exemplary embodiment in that the configuration of the mechanism of force presenting means is changed. In the following description, the same reference symbols are given to the same constituents as those in the above exemplary embodiments, and overlapping descriptions thereof are omitted. Moreover, the configuration in which the guide movement part 30 is moved in the Z-axis direction by rotating the screw 64, is similar to that in the third exemplary embodiment.

FIG. 13A and FIG. 13B are diagrams showing a relationship between an input detection state and an output presenting method according to the fourth exemplary embodiment of the present invention. In the first exemplary embodiment, as shown in FIG. 4A and FIG. 4B, when presenting a force on the XY-plane, a force is presented to the operation lever 61 of the operation unit 1 with the pulling force of the wire 35. On the other hand, in the present exemplary embodiment, when presenting a force on the XY-plane, as shown in FIG. 13A, a resistive force (presenting force) with respect to an input operation is generated by stopping the movement of a cover 17, using a stopper 70.

This stopper 70 has one end part connected to the guide movement part 30, and the other end part thereof is provided so as to be able to protrude into a slit 11B of the lid member 11. As shown in FIG. 13A, in a state where the operation lever 12 is on the XY-axis direction movement guide surface 15, the screw 64 is rotated and the guide movement part 30 is moved upward in the Z-axis direction. Thereby, the other end part of the stopper 70 is made to protrude into the slit 11B of the lid member 11. As a result, XY-axis direction movement of the operation lever 12 is restricted by the stopper 70 and the cover 17.

In presenting a Z-axis direction force, in the first exemplary embodiment, a force is presented with the resultant force of the pulling force of the wire 35 and the extending force with respect to compression of the compression spring 32. On the other hand, in this fourth exemplary embodiment, as shown in FIG. 13B, movement of the guide movement part 30 in the upward direction and downward direction (positive/negative) is performed by generating a force with rotation of the screw 64, and thereby, a tactile force sense in the Z-axis direction can be presented to the operation lever 61 of the operation unit 1. In presenting a tactile force sense in the Z-axis direction, a resistive force (presenting force) with respect to an input operation of the operation lever 61 of the operation unit 1 can be presented, and in addition, a tactile force sense can be presented in both of the upward direction and downward direction (positive/negative) at an arbitrary timing.

While the exemplary embodiments of the present invention have been described with reference to the drawings, the specific configuration thereof is not limited to these exemplary embodiments, and design modifications may be made without departing from the scope of the invention.

This application is based upon and claims the benefit of priority from Japanese patent application No. 2009-034049, filed Feb. 17, 2009, the disclosure of which is incorporated herein in its entirety by reference.

INDUSTRIAL APPLICABILITY

The tactile force sense presenting technique of the present invention may be applied to an operation unit of an electronic device such a mobile phone, a PDA, a laptop PC, a game console, and a television remote controller.

REFERENCE SYMBOLS

1 Operation unit
2 Input detection sensor
3 Tactile force sense presenting actuator
4 Simulator calculation unit
5 Database
6 Actuator control unit
7 Information display unit
12 Operation lever
15 XY-axis direction movement guide surface
16 Z-axis direction movement guide surface
20 XY-axis movement detection unit (sensor)
21 Z-axis movement detection unit (sensor)
23 Memory storage unit
24 Information processing unit
25 Control unit
30 Guide movement part
33 Driving unit
50 XY-axis force detection unit
51 Z-axis force detection unit
60 Direction conversion unit
61 Operation lever
C Calculation control unit
D Drive transmission unit
Center position
a Detection data
b Virtual physical data
c Presenting data
d Control data
e Display data

The invention claimed is:

1. A tactile force sense presenting device comprising:
an operation lever;
a movement guide surface for bounding a slide motion of the operation lever in a first XY-planar direction and a push-in motion of the operation lever in a first Z-axis direction;
at least one controller configured to:
determine the slide motion of the operation lever in the first XY-planar direction and the push-in motion of the operation lever in the first Z-axis direction;
determine a resistive force in a second XY-planar direction based on the slide motion; and
determine an adjusting force in a third XY-planar direction based on the push-in motion of the operation lever; and
at least one actuator to apply the resistive force and the adjusting force to the operation lever.

2. The tactile force sense presenting device according to claim 1, wherein the at least one actuator pulls the operation lever toward a specific position with a pulling force caused by a wire.

3. The tactile force sense presenting device according to claim 1, wherein the at least one actuator applies a force sufficient to move the operation lever in at least one of a fourth XY-planar direction and a second Z-axis direction to move the operation lever toward a specific position.

4. The tactile force sense presenting device according to claim 1, further comprising a stopper configured to:
prevent the slide motion of the operation lever in the first XY-planar direction by applying at least one of the resistive force and the adjusting force.

5. The tactile force presenting device according to claim 1, wherein the at least one controller is further configured to:
determine an XY-position of the operation lever on an XY; and
determine a Z-position of the operation lever on a Z-axis.

6. The tactile force presenting device according to claim 1, wherein the at least one controller is further configured to:
determine a first input force of the operation lever in the first XY-planar direction; and
determine a second input force of the operation lever in the first Z-axis direction.

7. The tactile force sense presenting device according to claim 1, wherein the at least one actuator uses one of a clockwise rotation and a counterclockwise rotation of a motor.

8. The tactile force sense presenting device according to claim 1, wherein the at least one actuator comprises at least one BioMetal actuator providing a compressing force.

9. The tactile force sense presenting device according to claim 1, wherein the at least one actuator uses a clockwise rotation and a counterclockwise rotation of a motor.

10. A tactile force sense presenting device comprising:
an operation lever;
a movement guide surface for bounding a slide motion of the operation lever in a first XY-planar direction and a push-in motion of the operation lever in a first Z-axis direction;
at least one controller configured to:
determine the slide motion of the operation lever in the first XY-planar direction and the push-in motion of the operation lever in the first Z-axis direction;
determine a resistive force in a second XY-planar direction based on the slide motion;
determine an adjusting force in a third XY-planar direction based on the push-in motion of the operation lever;
determine a simulating force based at least in part on virtual physical data in a database; and
update the virtual physical data by simulating a physical phenomenon in a virtual space; and
at least one actuator for applying the resistive force, the adjusting force, and the simulating force.

11. The tactile force sense presenting device according to claim 10, wherein the virtual physical data further comprises:
at least one virtual object comprising a spring coefficient, a damper coefficient, and a mass coefficient; and
a virtual pointer in the virtual space corresponding to a physical position of the operation lever.

12. The tactile force sense presenting device according to claim 10, wherein the at least one controller is further configured to translate a physical movement of the operation lever into a virtual movement of the virtual pointer in the virtual space.

13. The tactile force sense presenting device according to claim 10, wherein the virtual movement of the virtual pointer is based at least in part on a speed of movement of the operation lever.

14. The tactile force sense presenting device according to claim 10, wherein the at least one actuator applies the resistive force to pull the operation lever toward a specific position.

15. The tactile force sense presenting device according to claim 10, wherein the at least one actuator stops a movement of the operation lever.

16. A tactile force sense presenting method comprising:
bounding a slide motion of an operation lever in a first XY-planar direction and a push-in motion of the operation lever in a first Z-axis direction;
determining the slide motion of the operation lever in the first XY-planar direction and the push-in motion of the operation lever in the first Z-axis direction;
determining a resistive force in a second XY-planar direction based on the slide motion;
determining an adjusting force in a third XY-planar direction based on the push-in motion of the operation lever;
determining a simulating force based at least in part on virtual physical data in a database;
updating the virtual physical data by simulating a physical phenomenon in a virtual space; and
applying the resistive force, the adjusting force, and the simulating force.

17. The tactile force sense presenting method according to claim 16, further comprising translating a physical movement of the operation lever into a virtual movement of the virtual pointer in the virtual space.

18. The tactile force sense presenting method according to claim 16, wherein the virtual movement of the virtual pointer is based at least in part on a speed of movement of the operation lever.

19. The tactile force sense presenting method according to claim 16, further comprising applying the resistive force to pull the operation lever toward a specific position.

20. The tactile force sense presenting method according to claim 16, further comprising stopping a movement of the operation lever.

21. The tactile force sense presenting device according to claim 1, wherein the at least one controller is further configured to determine a second resistive force in a second Z-axis direction, and wherein the at least one actuator further applies the second resistive force to the operating lever.

22. The tactile force sense presenting device according to claim 10, wherein the at least one controller is further configured to determine a second resistive force in a second Z-axis direction, and wherein the at least one actuator further applies the second resistive force to the operating lever.

23. The tactile force sense presenting method according to claim 16, further comprising:
   determining a second resistive force in a second Z-axis direction; and
   applying the second resistive force to the operating lever.

24. A tactile force apparatus comprising:
   a button, configured to move laterally within a surface oriented to an XY-plane and configured to depress, into the surface, parallel to a Z-axis and perpendicular to the XY-plane;
   at least one controller, configured to determine a first feedback force parallel to the XY-plane based at least in part on a Z-position of the button; and
   at least one actuator, configured to apply the first feedback force to the button.

25. The tactile force apparatus of claim 24, wherein the at least one controller is further configured to correlate at least one of a physical input force and a physical input position of the button to at least one of a virtual input force and a virtual input position of a virtual user object in a virtual space.

26. The tactile force apparatus of claim 25, wherein the at least one controller is further configured to simulate virtual force interactions with at least one other virtual object in the virtual space; where the first feedback force is based in part on the virtual force interactions.

27. The tactile force apparatus of claim 26, wherein the at least one other virtual object in the virtual space is a virtual wall, and wherein applying the first feedback force to the button resists movement of the button correlated to a virtual movement of the virtual user object through the virtual wall.

28. The tactile force apparatus of claim 26, wherein the at least one controller is further configured to correlate the Z-position of the button to a virtual contact between the virtual user object and a virtual surface positioned under the virtual user object.

29. The tactile force apparatus of claim 28, wherein a physical XY-direction of the first feedback force corresponds to a virtual XY-direction of a virtual flow of the virtual surface.

30. The tactile force apparatus of claim 28, wherein a physical magnitude of the first feedback force corresponds to a virtual material of the virtual surface.

31. The tactile force apparatus of claim 28, wherein a physical magnitude of the first feedback force corresponds to the Z-position of the button.

* * * * *